United States Patent
Kumar et al.

(10) Patent No.: US 12,531,641 B2
(45) Date of Patent: Jan. 20, 2026

(54) SYSTEM AND METHODS FOR OFFSET AND THRESHOLD CALIBRATION IN LOSS OF SIGNAL DETECTION CIRCUITS

(71) Applicant: Microchip Technology Incorporated, Chandler, AZ (US)

(72) Inventors: Rapina Siva Kumar, Karnataka (IN); Shashi Jain, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/800,049

(22) Filed: Aug. 10, 2024

(65) Prior Publication Data

US 2025/0266911 A1 Aug. 21, 2025

(51) Int. Cl.
*H04B 17/21* (2015.01)
*H03K 5/24* (2006.01)
*H04L 27/00* (2006.01)

(52) U.S. Cl.
CPC .............. *H04B 17/21* (2015.01); *H03K 5/24* (2013.01); *H04L 27/0002* (2013.01)

(58) Field of Classification Search
CPC ........ H04B 17/21; H03K 5/24; H04L 27/0002
See application file for complete search history.

(56) References Cited

U.S. PATENT DOCUMENTS

| | | | | |
|---|---|---|---|---|
| 6,377,082 | B1* | 4/2002 | Loinaz | H04L 1/20 327/24 |
| 6,489,803 | B1* | 12/2002 | Steiner | H04B 17/318 327/205 |
| 8,379,765 | B2* | 2/2013 | Farjad-Rad | H04L 7/0037 375/357 |
| 9,515,785 | B2* | 12/2016 | Tonietto | H04L 7/0033 |

\* cited by examiner

*Primary Examiner* — Freshteh N Aghdam
(74) *Attorney, Agent, or Firm* — SLAYDEN GRUBERT BEARD PLLC

(57) ABSTRACT

Communication circuits and systems may include circuitry to detect the loss of the input signal. These circuits may be termed Loss of Signal (LOS) circuits. Changes to channel length and frequency of transmission may introduce uncertainty in detection circuits. A system may include a offset calibration mode and a hysteresis calibration mode to modify circuit performance in the presence of variations in process, voltage and temperature (PVT) and may improve performance of LOS circuits.

15 Claims, 11 Drawing Sheets

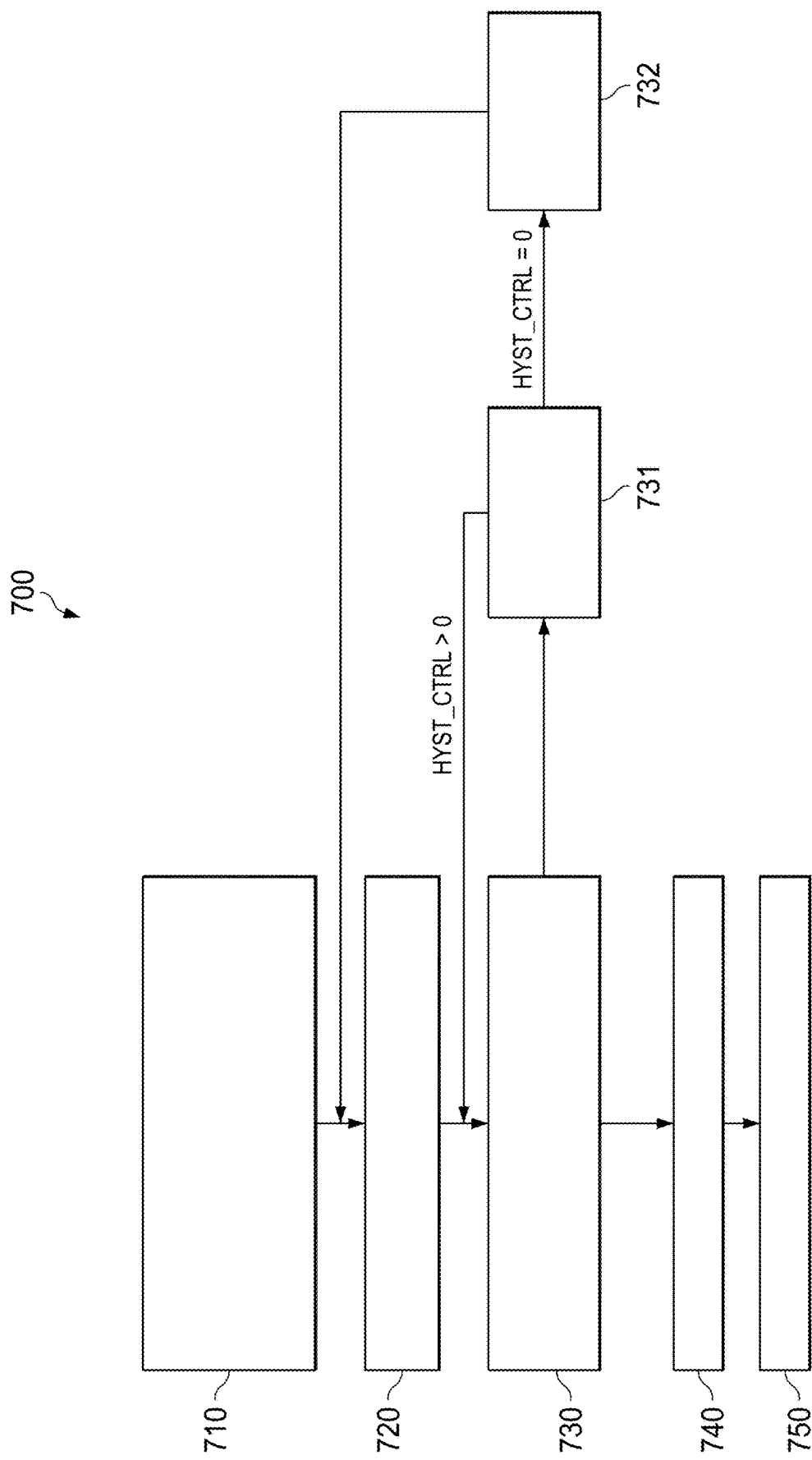

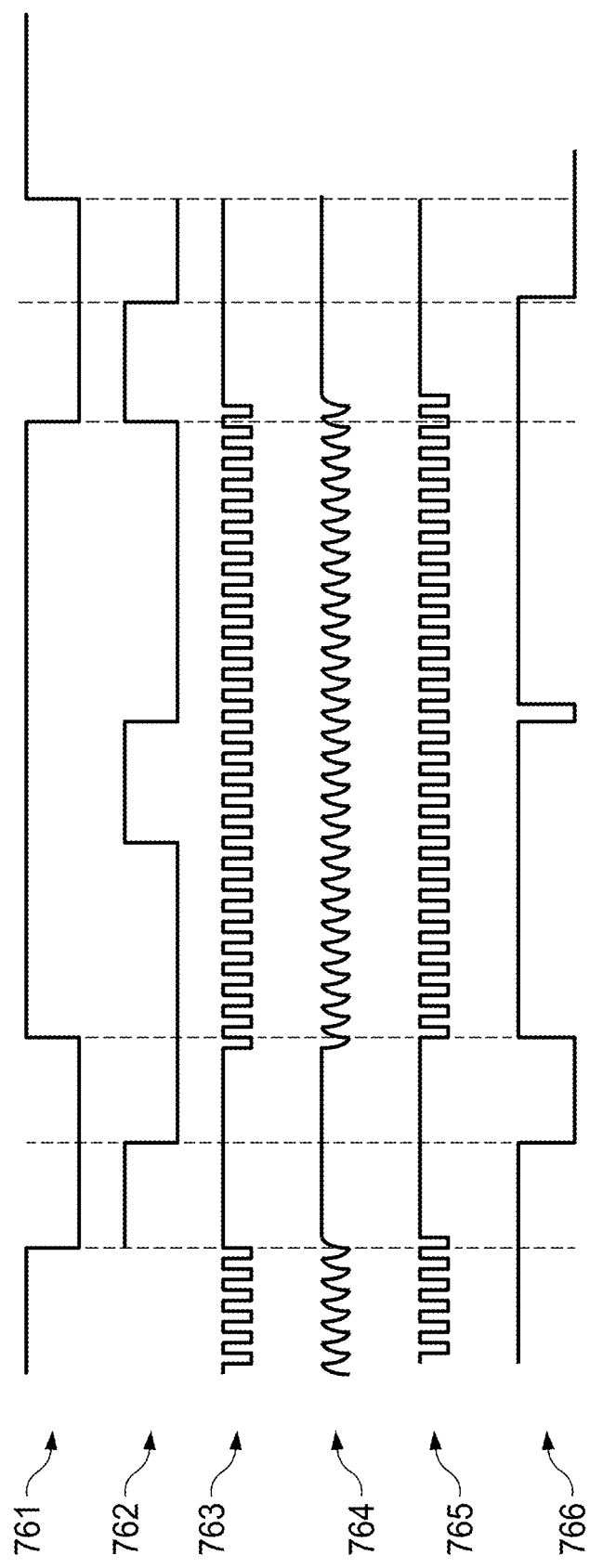

SYSTEM AND METHODS FOR OFFSET AND THRESHOLD CALIBRATION IN LOSS OF SIGNAL DETECTION CIRCUITS

PRIORITY

This application claims priority to commonly owned Indian Provisional Patent Application No. 202411011021 filed Feb. 16, 2024, the entire contents of which are hereby incorporated by reference for all purposes.

FIELD OF THE INVENTION

The present disclosure relates to a system and method for calibrating offsets and thresholds in loss of signal detection circuit.

BACKGROUND

Communication circuits and systems may include circuitry to detect the loss of the input signal. These circuits may be termed Loss of Signal (LOS) circuits.

An LOS circuit may include an envelope detector which checks whether the input signal has enough amplitude or not to be reconstructed by the analog front-end (AFE). If the input signal has amplitude lower than a minimum threshold, the LOS circuit may output a signal in a first polarity to indicate detection of a loss of the input signal. If the input signal has amplitude higher than a minimum threshold, then the LOS circuit may output a signal in a second polarity to indicate presence of the input signal.

LOS circuits must work for all communication speeds and for all possible data types, modulation formats and channel configurations supported by the device. These and other constraints may require a wide bandwidth of operation in the LOS circuit.

LOS circuits must also operate across a wide range of possible channel lengths. As data rate changes the maximum channel length changes proportionally and this may lead to more uncertainty.

The LOS circuit detection threshold should be calibrated to the middle of the range to get the optimum performance. Apart from signal random pattern, process, voltage and temperature (PVT) variations also change the threshold of the LOS circuit.

To compensate the spread of input signal amplitudes which LOS detects, run length and PVT Programmability and Calibration of the LOS Threshold is needed. In addition, offset compensation is proposed to improve the LOS performance further.

There is a need for circuitry which may calibrate the offsets and thresholds in an LOS circuit to compensate for variations due to PVT, run length and data rates.

SUMMARY

The examples herein enable a system for calibration of offset and hysteresis in a communication system.

According to one aspect, a system includes one or more signal inputs coupled to a first switch network and coupled to an analog front end (AFE) circuit. A comparator may include one or more comparator inputs, a hysteresis control code input and at least one offset voltage input. The first switch network may selectively couple one of the one or more signal inputs and one or more calibration voltage inputs to the one or more comparator inputs. The comparator may be coupled to a calibration control circuit. A transition detection circuit may be coupled to one or more outputs of the comparator and the transition detection circuit may generate a signal detection indicator. The calibration control circuit may include a programmable divider to divide a reference clock. The calibration control circuit may include a variable amplitude signal generator to receive the output of the programmable divider and an amplitude control code. The variable amplitude signal generator may generate a signal with an amplitude based on the amplitude control code. A second switch network may receive input from the output of the variable amplitude signal generator and from a common mode voltage. The second switch network may couple the common mode voltage to the calibration voltage inputs in an offset calibration mode and the second switch network ma couple the outputs of the variable amplitude signal generator to the calibration voltage inputs in a hysteresis calibration mode. A threshold calibration circuit may take input from the signal detection indicator and may generate a hysteresis control signal. The hysteresis control signal may be coupled to the hysteresis control code input of the comparator. The threshold calibration circuit may generate the amplitude control signal and the amplitude control signal may be coupled to the variable amplitude signal generator. An offset calibration logic circuit may take input from the one or more outputs of the comparator and may generate the at least one offset voltage input to the comparator. A controller may receive input from the comparator output and the signal detection indicator and may enable the offset calibration mode and the hysteresis calibration mode based on the comparator output and the signal detection indicator.

According to one aspect, a method may include steps of: performing an offset calibration of a comparator, the offset calibration comprising steps of: coupling one or more inputs of a comparator to a common mode voltage, setting a hysteresis control code, coupling the hysteresis control code to a hysteresis setting input of the comparator, sweeping an offset control code to the comparator in one or more steps from a first value to a second value, detecting a change in polarity of the comparator output, recording a value of the offset control code corresponding to the change in polarity of the comparator output for respective values of the hysteresis control code, and repeating the offset calibration for respective values of the hysteresis control code to generate a first look-up table of offset control codes and respective hysteresis control codes. The method may include steps of: performing a hysteresis calibration of the comparator, the hysteresis calibration comprising: setting an amplitude control code and a hysteresis control code, coupling the amplitude control code to an input of a variable amplitude signal generator and coupling the hysteresis control code to the comparator, sweeping the hysteresis control code in one or more steps from a minimum value to a maximum value and setting the offset voltage input to the comparator at respective steps based on values recorded in the first look-up table, detecting a signal detection indicator of a transition detection circuit, and recording the amplitude control code, the hysteresis control code and the offset voltage code corresponding to the signal detection indicator in a second look-up table.

BRIEF DESCRIPTION OF THE DRAWINGS

FIG. 7A illustrates one of various examples of a method of calculating hysteresis control values.

FIG. 7B illustrates one of various examples of signals during a hysteresis calibration.

DETAILED DESCRIPTION

Figure 1:
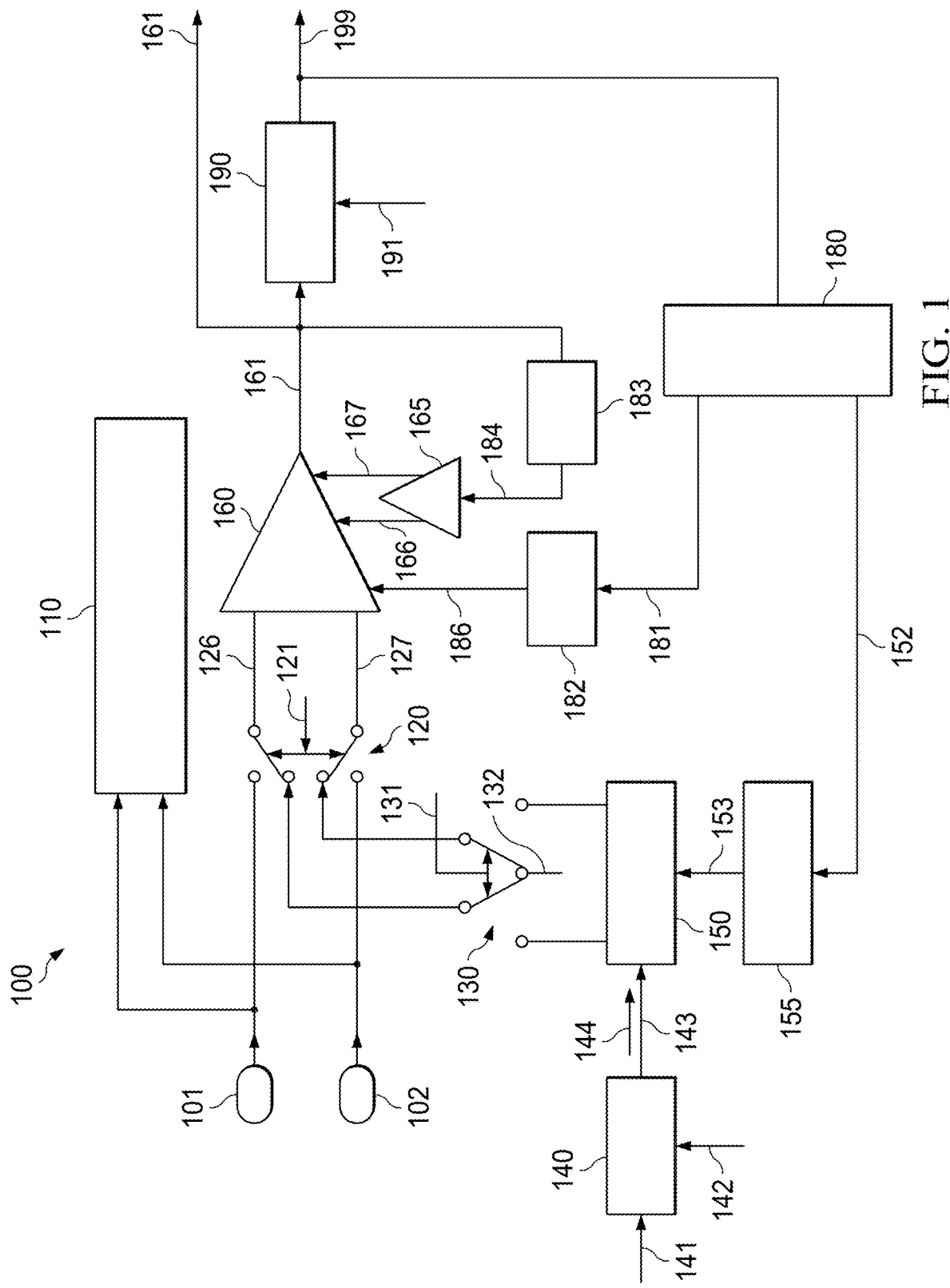
FIG. 1 illustrates one of various examples of a system for calibrating offsets and thresholds in loss of signal detection circuit.

FIG. 1 illustrates one of various examples of a system 100 for calibrating offsets and thresholds in a loss of signal (LOS) detection circuit.

System 100 may include one or more signal inputs. The one or more signal inputs may include a positive polarity input 101 and a negative polarity input 102. Positive polarity input 101 and negative polarity input 102 may be coupled to analog front end (AFE) 110.

Positive polarity input 101 and negative polarity input 102 may be coupled to first switch network 120 and second switch network 130. First switch select signal 121 may control the configuration of first switch network 120. Second switch select signal 131 may control the configuration of second switch network 130. The output of second switch network 130 may be termed a calibration voltage input.

Reference clock 141 may be input to programmable divider 140. Programmable divider 140 may generate positive polarity divider output 143 and negative polarity divider output 144 based on reference clock 141 and divider control signal 142. Divider control signal 142 may specify a divide ratio, and programmable divider 140 may divide reference clock 141 by the specified divide ratio.

The outputs of first switch network 120 may be coupled to comparator 160. Comparator 160 may generate comparator output 161. Comparator output 161 may be input to transition detection circuit 190. A reset signal 191 may be input to transition detection circuit 190. Transition detection circuit 190 may output signal detection indicator 199. Transition detection circuit 190 may detect a change in the value of comparator output 161.

Signal detection indicator 199 may be input to threshold calibration circuit 180. Threshold calibration circuit 180 may output amplitude control signal 152. Amplitude control signal 152 may be input to amplitude thermometer decoder 155. The output of amplitude thermometer decoder 155 may be amplitude control code 153. Amplitude control code 153 may be input to variable amplitude signal generator 150. Variable amplitude signal generator 150 may generate one or more signal outputs based on positive polarity divider output 143 and negative polarity divider output 144 and based on amplitude control code 153. Amplitude control code 153 may be input to variable amplitude signal generator 150. The one or more outputs of variable amplitude signal generator 150 may be input to second switch network 130.

Threshold calibration circuit 180 may output hysteresis control signal 181. Hysteresis control signal 181 may be input to hysteresis thermometer decoder 182. Hysteresis thermometer decoder 182 may output hysteresis control code 186. Hysteresis control code 186 may be input to comparator 160 and may set a hysteresis setting in comparator 160. Comparator 160 may also be termed a transition detection comparator and may also be termed a valid amplitude signal transition detection comparator.

Comparator output 161 may be input to offset calibration logic circuit 183, and offset calibration logic circuit 183 may generate an offset control code 184. Offset control code 184 may be input to digital-to-analog converter (DAC) 165, which may generate a positive voltage 166 and negative voltage 167 to comparator 160. Positive voltage 166 may comprise an offset voltage input to comparator 160. Negative voltage 167 may comprise an offset voltage input to comparator 160. Positive voltage 166 and negative voltage 167 may comprise a pair of signals in a differential configuration.

In operation, during an offset calibration mode, a first switch select signal 121 may be set to couple the outputs of second switch network 130 to the inputs of comparator 160. Voltage Common Mode (VCM) signal 132 may be a common mode voltage of comparator 160. Second switch select signal 131 may be set to couple the VCM signal 132 to the inputs of first switch network 120. In this manner, VCM signal 132 may be coupled to the inputs of comparator 160. In the offset calibration mode, for respective values of hysteresis control signal 181, offset control code 184 may be swept from a minimum value to a maximum value or from a maximum value to a minimum value. The value of offset control code 184 corresponding to a change in polarity of comparator output 161 may be stored in a first lookup table as the offset value for respective values of hysteresis control signal 181.

In operation, during a hysteresis calibration mode, first switch select signal 121 may be set such that first switch network 120 may couple the outputs of second switch network 130 to the inputs of comparator 160. Second switch select signal 131 may be set such that second switch network 130 may couple outputs of variable amplitude signal generator 150 to the inputs of first switch network 120. In the hysteresis calibration mode, for respective values of amplitude control signal 152, hysteresis control signal 181 may be swept from a minimum value to a maximum value or from a maximum value to a minimum value. At respective settings of hysteresis control signal 181, offset control code 184 may be set based on the value stored in the first lookup table as described previously. In a second lookup table, values of hysteresis control signal 181 and offset control signal 152 may be recorded corresponding to a change in signal detection indicator 199 for respective amplitude control signal values.

In one of various examples, comparator output 161 and signal detection indicator 199 may be coupled to controller 189. Controller 189 may control system 100 and enable the offset calibration mode and the hysteresis calibration mode at predetermined times. Controller 189 may be a microcontroller or may be part of a larger system-on-a-chip. Controller 189 may be a dedicated hardware component for control of system 100.

During a normal mode, first switch network 120 may couple positive polarity input 101 and negative polarity input 102 to the inputs of comparator 160.

Transition detection circuit 190, threshold calibration circuit 180, hysteresis thermometer decoder 182, offset calibration logic circuit 183, DAC 165, programmable divider 140, variable amplitude signal generator 150, and amplitude thermometer decoder 155 may comprise a calibration control circuit.

Figure 2:
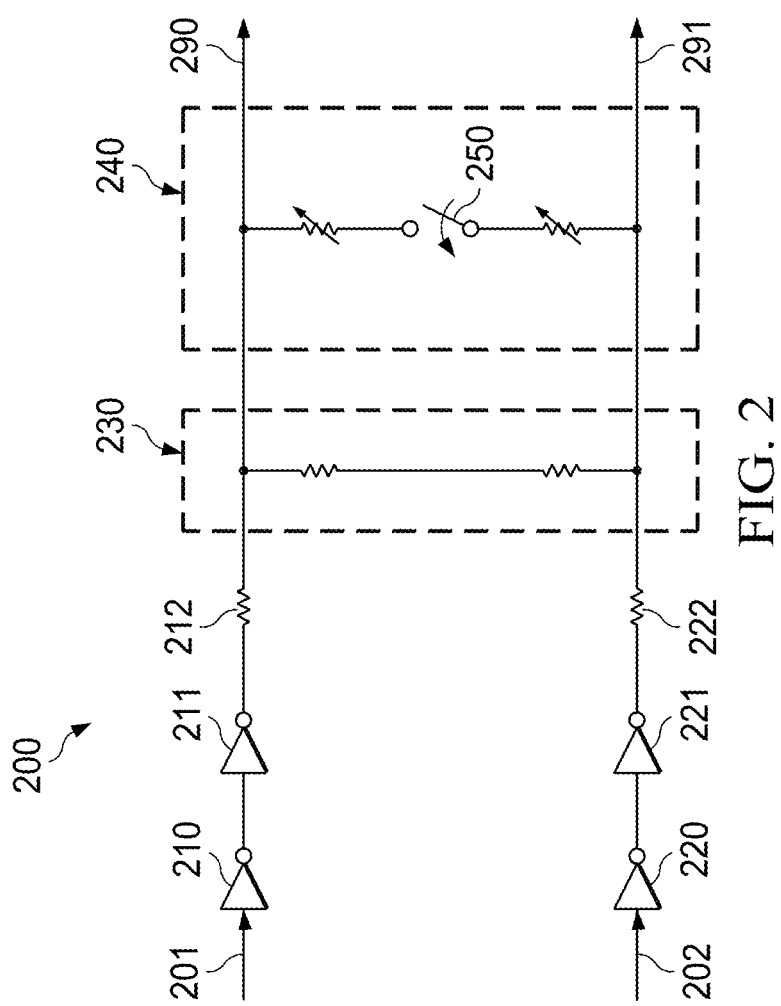
FIG. 2 illustrates one of various examples of a variable amplitude signal generator.

FIG. 2 illustrates one of various examples of a variable amplitude signal generator 200. Variable amplitude signal generator 200 may include a positive clock input 201 and a negative clock input 202. Positive clock input 201 may be coupled to positive polarity divider output 143 as described and illustrated in reference to FIG. 1. Negative polarity input 102 may be coupled to negative polarity divider output 144 as described and illustrated in reference to FIG. 1. Positive clock input 201 may be input to first inverter 210, and the output of first inverter 210 may be input to second inverter 211. The output of second inverter 211 may be input to resistor 212.

Negative clock input 202 may be input to third inverter 220, and the output of third inverter 220 may be input to fourth inverter 221. The output of fourth inverter 221 may be input to resistor 222.

Fixed resistor elements 230 may be coupled between resistor 212 and resistor 222. Programmable resistor elements 240 may be coupled between resistor 212 and 222. Fixed resistor elements 230 may be in parallel with programmable resistor elements 240.

One or more control signals 250 may modify the resistance of programmable resistor elements 240 and may modify the amplitude of positive output 290 and negative output 291. In one of various examples, control signal 250 may be coupled to amplitude control code 153 as described and illustrated in reference to FIG. 1.

Figure 3:
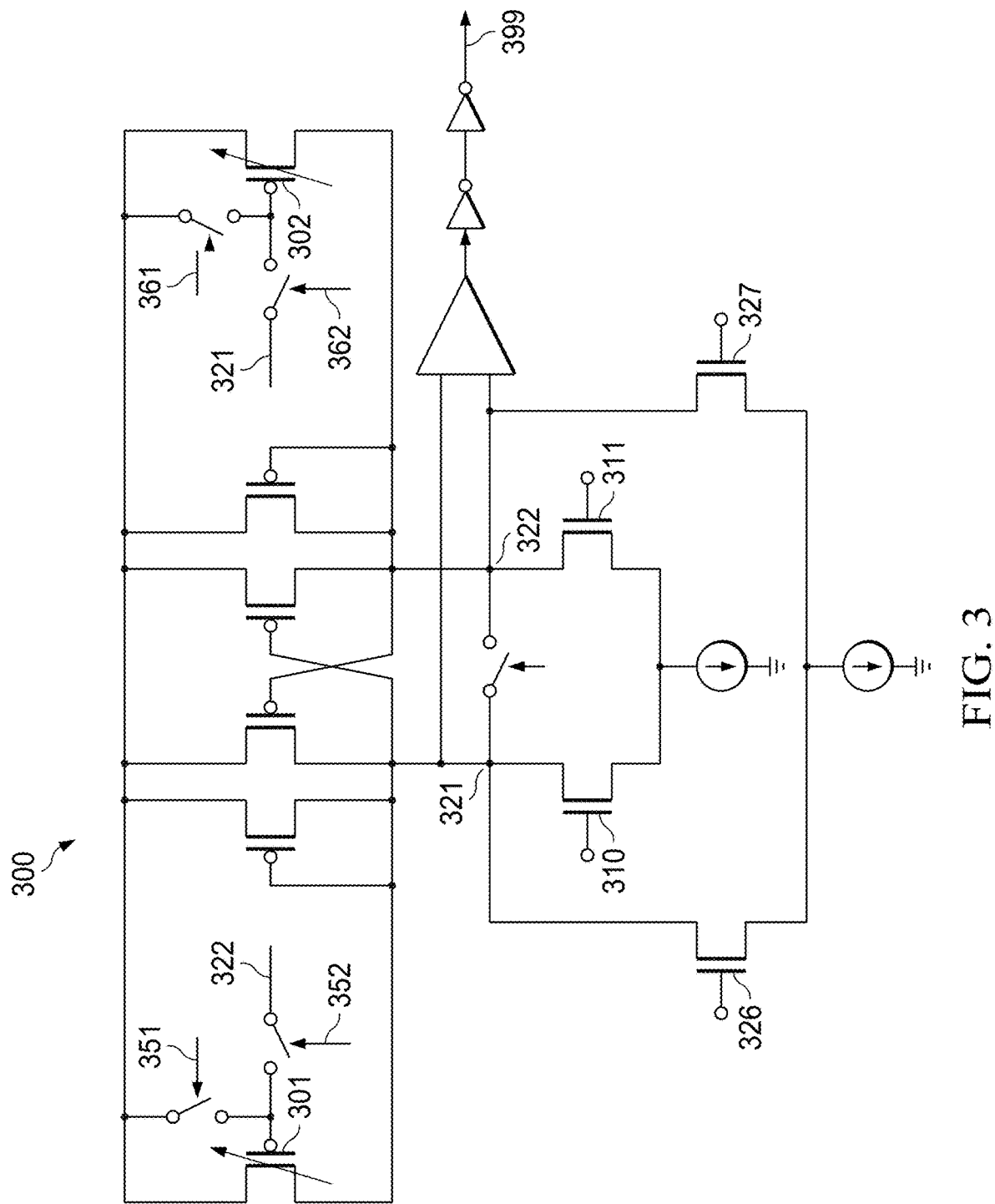
FIG. 3 illustrates one of various examples of a hysteresis comparator with programmable thresholds.

FIG. 3 illustrates one of various examples of a hysteresis comparator 300 with programmable hysteresis threshold. Hysteresis comparator 300 may be one of various examples of comparator 160 as described and illustrated in reference to FIG. 1.

Devices 301 and 302 may modify the amount of hysteresis at positive input 310 and negative input 311, based on the settings of switch controls 351, 352, 361, 362. Device 301 may be illustrated as a signal device, but in one of various examples, device 301 may comprise multiple discrete devices, each with dedicated switch controls. As one of various examples, device 301 may comprise 15 discrete devices. Device 302 may be illustrated as a signal device, but in one of various examples, device 302 may comprise multiple discrete devices, each with dedicated switch controls. As one of various examples, device 302 may comprise 15 discrete devices.

Switch control 352 may selectively couple the gate of device 301 to first stage comparator output 322. Switch control 362 may selectively couple the gate of device 302 to first stage comparator output 321.

Positive input 310 may be one of various examples of the positive polarity input 126 of comparator 160 as described and illustrated in reference to FIG. 1. Negative input voltage 311 may be one of various examples of the negative polarity input 127 of comparator 160 as described and illustrated in reference to FIG. 1.

Positive DAC voltage 326 may be one of various examples of positive voltage 166, an output of DAC 165, as described and illustrated in reference to FIG. 1. Negative DAC voltage 327 may be one of various examples of negative voltage 167, an output of DAC 165, as described and illustrated in reference to FIG. 1.

In operation, switch control 351 and 352 may selectively enable device 301 and may control the hysteresis threshold of hysteresis comparator 300. In operation, switch control 361 and 362 may selectively enable device 302 and may control the hysteresis threshold of hysteresis comparator 300.

Node 399 may comprise the output of hysteresis comparator 300. Node 399 may represent comparator output 161, an output of comparator 160, as described and illustrated in reference to FIG. 1. Node 399 may transition based on the voltage at positive input 310, negative voltage 311, and the hysteresis setting controlled by switch control 351, 352, 361 and 362.

Figure 4:
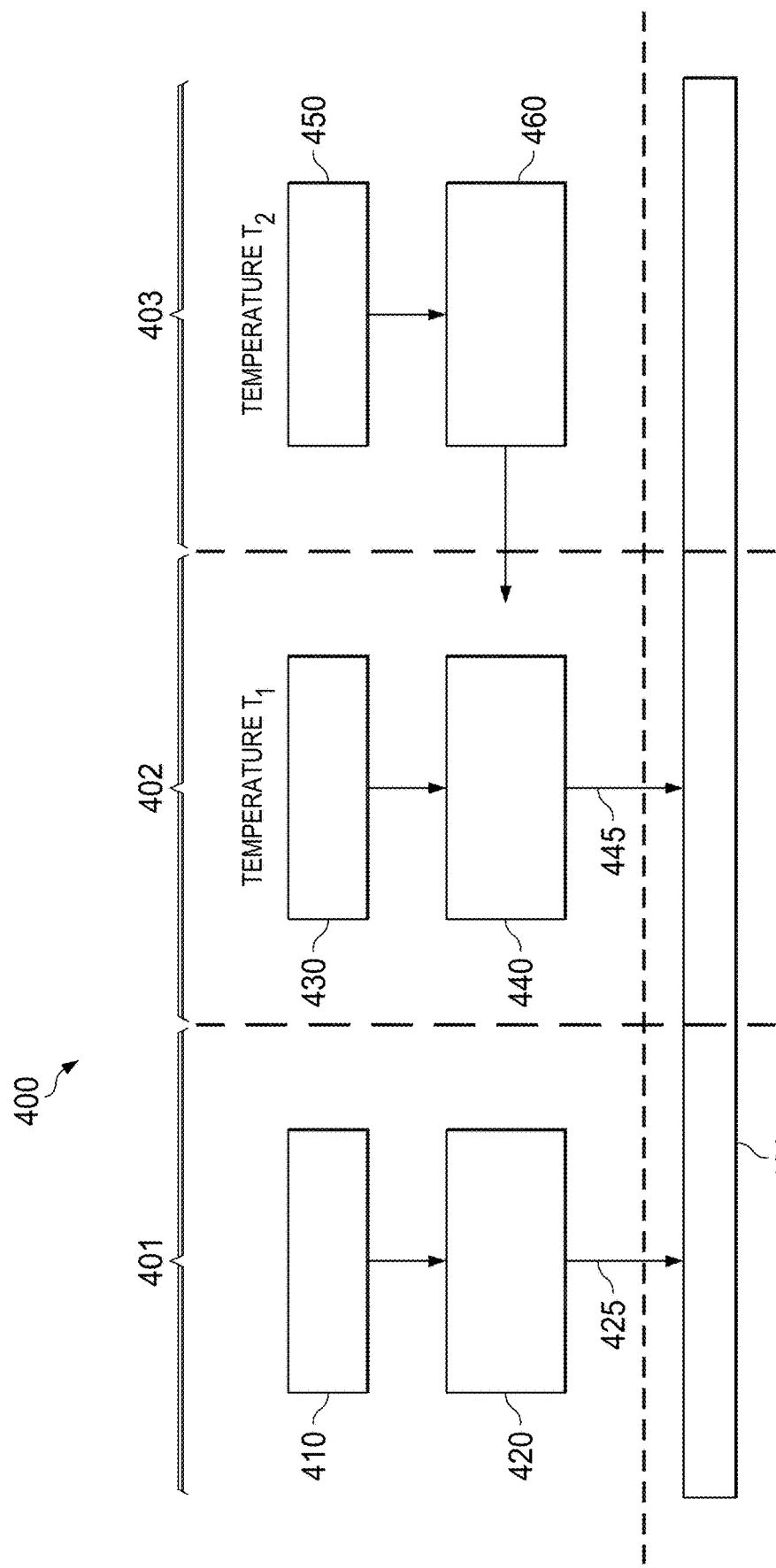
FIG. 4 illustrates one of various examples of modes of operation without temperature compensation.

FIG. 4 illustrates one of various examples of modes of operation in a loss of signal detection system without temperature compensation. Modes of operation may include an offset calibration mode 401, a hysteresis calibration mode 402 and a normal mode 403.

In an offset calibration mode 401, an offset calibration step may be executed at operation 410. An offset value may be determined in operation 420, and an offset calibration value 425 may be input to the loss of signal detection system 490. Offset calibration value 425 may be written to an amplifier hysteresis lookup table. Offset calibration mode 401 may be performed at a first temperature T1.

In a hysteresis calibration mode 402, a hysteresis calibration step may be executed at operation 430. A hysteresis code lookup table may be accessed for each amplitude selection code in operation 430, based on the output of the hysteresis calibration step at operation 430 and a amplifier select code 461. A hysteresis control value 445 and respective hysteresis code values related to offset code may be set and may be input to the loss of signal detection system 490. An amplifier hysteresis lookup table may be accessed, and a hysteresis control value at operation 440 may be set and may be input to the loss of signal detection system. Hysteresis calibration mode 402 may be performed at a first temperature T1.

In a normal mode 403, an input may be provided at operation 450 which indicates the data rate or the run length of a random data pattern. Based on the input provided, a different amplitude selection control code may be selected for the respective data rate or the run length. Based on the respective selected amplifier select code 461, the respective calibrated hysteresis code is selected from a lookup table generated in operation 440 and respective offset code for the respective hysteresis code calibrated in operation 420 may be input to loss of signal detection system 490 during normal mode of operation.

Figure 5:
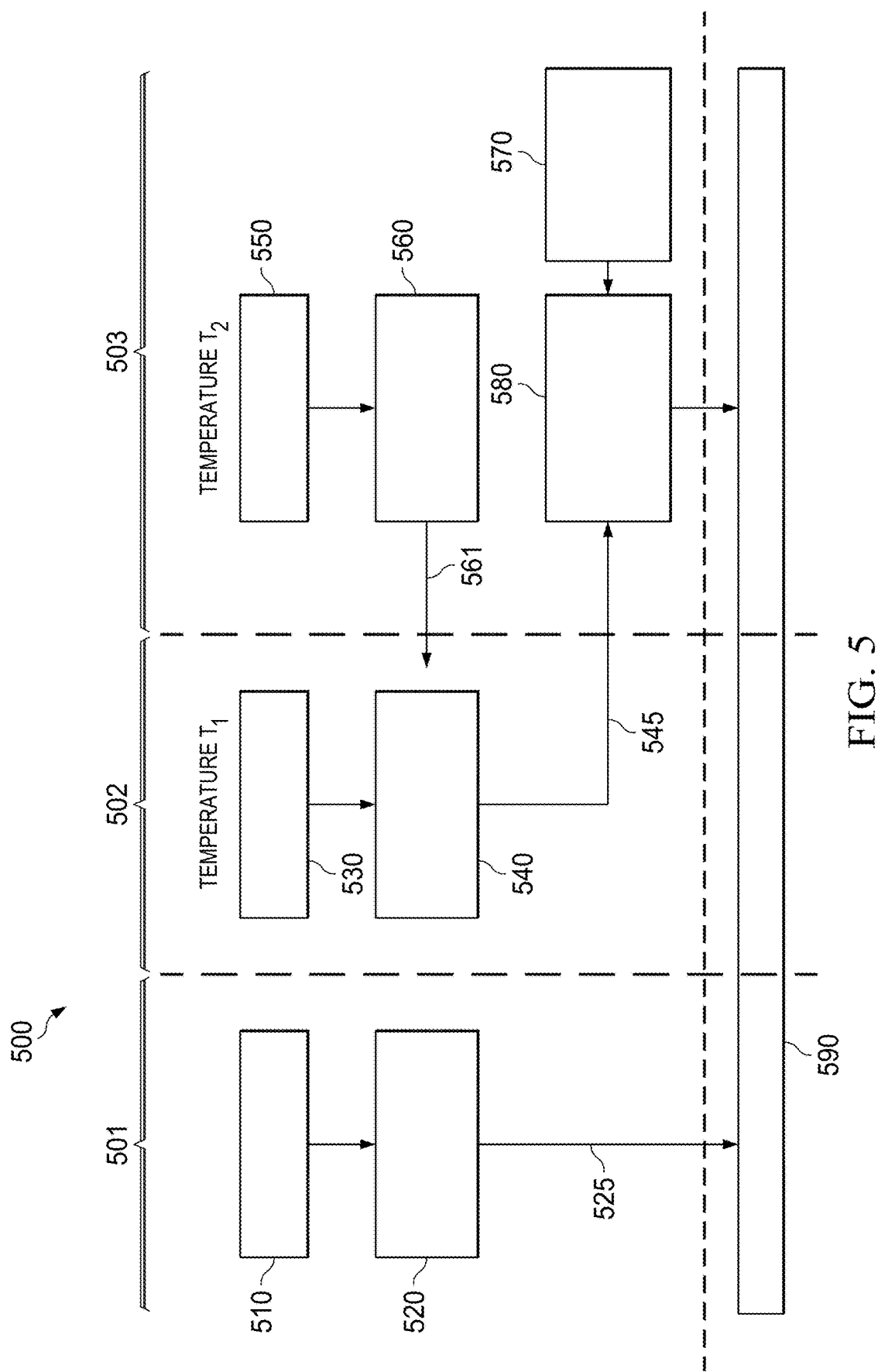
FIG. 5 illustrates another example of modes of operation including temperature compensation.

FIG. 5 illustrates an example of modes of operation including temperature compensation. Modes of operation may include an offset calibration mode 501, a hysteresis calibration mode 502 and a normal mode 503.

In an offset calibration mode 501, an offset calibration step may be executed at operation 510 and an offset value may be determined. In operation 520, an offset value of the comparator for respective hysteresis control codes of the comparator may be written to lookup table 525. Lookup table 525 may be input to loss of signal detection system 590. Offset calibration mode 501 may be performed at a first temperature T1.

In a hysteresis calibration mode 502, a hysteresis calibration step may be executed at operation 530. An amplifier hysteresis lookup table may be accessed, and based on the output of the hysteresis calibration step at operation 530 and an amplifier select code 561, a hysteresis control value 545 may be set. Hysteresis calibration mode 502 may be performed at a first temperature T1.

In a normal mode 503, an input may be provided at operation 550 which indicates the data rate or run length of a random data pattern. Based on the input provided from operation 550, an amplitude select code may be selected for the respective data rate or run length and may be used as part of a lookup operation to determine hysteresis control value 545.

Normal mode 503 may operate at a different temperature T2 from the temperature T1 of the offset calibration mode 501 and the hysteresis calibration mode 502. A temperature compensation hysteresis offset code calibration may be performed at operation 570, and may output a calibrated value to hysteresis control at operation 580. The temperature compensation hysteresis offset code calibration performed at operation 570 may be based on a temperature measurement.

Based on the output of hysteresis calibration lookup at operation 540 and the temperature compensation hysteresis offset code calibration performed at operation 570, resultant hysteresis code output at operation 580 may be input to loss of signal detection system 590.

Figure 6:
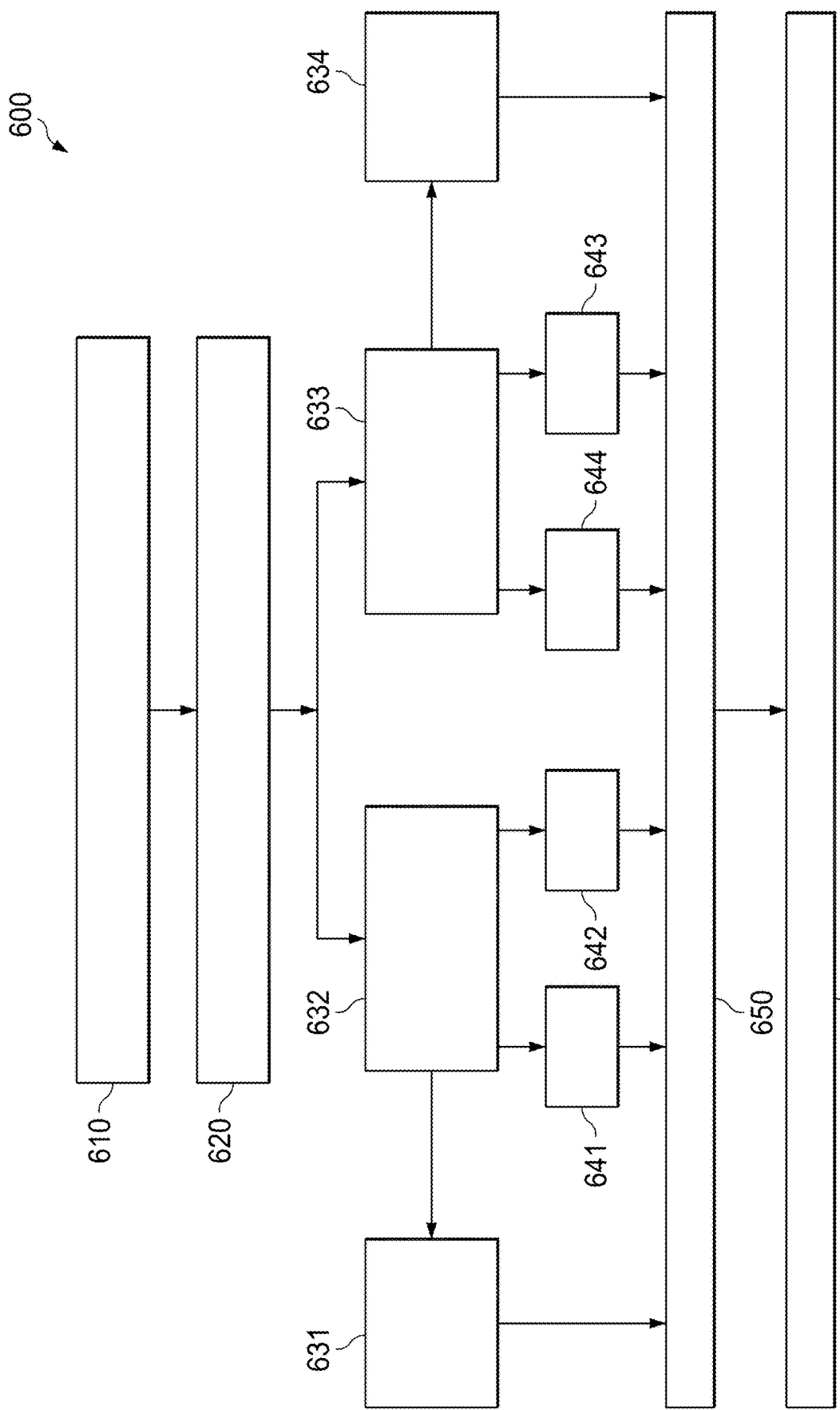
FIG. 6 illustrates one of various examples of a method of offset calibration across hysteresis control codes.

FIG. 6 illustrates one of various examples of a method of offset calibration across hysteresis control codes.

At operation 610, a calibration enable signal may be enabled and an offset calibration enable signal may be enabled, and an offset calibration routine may be started. A hysteresis control code may be incremented from a minimum value to a maximum value. At operation 620, the results of the incremental sweep of the offset control code may be input to a DAC, as described and illustrated in reference to DAC 165 of FIG. 1, and the output of the DAC may be applied to positive voltage 166 and negative voltage 167 as described and illustrated in reference to FIG. 1.

At operation 633, a positive sweep may be initiated and may modify the output of the DAC from a minimum value to a maximum value. The positive sweep may set a maximum positive offset at operation 643 if no low-to-high transition is detected at comparator output 161 during the sweep, and may set a maximum negative offset at operation 644 if the comparator output 161 is high at the maximum negative offset.

At operation 632, a negative sweep may be initiated and may modify the DAC output from a maximum value to a minimum value. The negative sweep may set a maximum positive offset at operation 642 if the comparator output 161 is low at the maximum value and may set a maximum negative offset at operation 641 if no high-to-low transition is detected at comparator output 161 during the sweep.

When a comparator detects a high-to-low transition, operation 631 may set a falling edge negative offset at the current offset value. When a comparator detects a low-to-high transition, operation 634 may set a rising edge positive offset at the current offset value. Operation 650 may calculate an average of the input offset values from operations 631, 641, 642, 644, 643 and 634. Operation 660 may save the average values to a lookup table.

FIG. 7A illustrates one of various examples of a method of calculating hysteresis control values.

At operation 710, a calibration enable signal and an offset calibration enable signal may be deasserted and this state may enable a hysteresis calibration mode.

An offset code 184 may be computed based on an offset calibration as described and illustrated in reference to FIG. 1. A hysteresis control code 186, as described and illustrated in reference to FIG. 1, may be set to a maximum value.

At operation 720, the amplitude control code input to the variable amplitude signal generator may be swept from a maximum value to a minimum value. The amplitude control code may be an amplitude control code 153 as described and illustrated in reference to FIG. 1.

At operation 730, the output of the transition detection comparator may be monitored. The transition detection comparator may be one of various examples of transition detection circuit 190 as described and illustrated in reference to FIG. 1. When a transition is detected, operation 740 may record values of the hysteresis control code and the amplitude control code at the transition point. Operation 750 may save the recorded values of the hysteresis control code and the amplitude control code to a lookup table.

If a transition is not detected in the transition detection comparator at operation 730, operation 731 may decrease the value of the hysteresis control code and return to operation 730. The transition detection comparator may be one of various examples of transition detection circuit 190 as described and illustrated in reference to FIG. 1. If the hysteresis control code is decrease and is set to zero at operation 731, operation 732 may set the hysteresis control code to the previous calibration value and return to operation 720.

FIG. 7B illustrates one of various examples of signals during a hysteresis calibration.

Trace 761 may represent a reset signal input to programmable divider 140 as described and illustrated in reference to FIG. 1. Trace 761 may be an active low reset signal as illustrated in FIG. 7B, or may be an active high reset signal. Trace 761 may allow time for signals to settle prior to the next active phase of hysteresis calibration.

Trace 762 may represent a reset signal input to transition detection circuit 190. Trace 762 may represent a clear signal or a refresh signal.

Trace 763 may represent an output of programmable divider 140 as described and illustrated in reference to FIG. 1. Trace 763 may toggle in response to trace 761 transitioning from an logic low reset state to a logic high active state.

Trace 764 may represent an input signal to transition detection circuit 190. In one of various examples, trace 764 may represent a differential voltage at the input of comparator 160, represented by the difference between positive polarity input 126 and negative polarity input 127, as described and illustrated in reference to FIG. 1.

Trace 765 may represent an input to signal to transition detection circuit 190. In one of various examples, trace 765 may represent a voltage on comparator output 161 as described and illustrated in reference to FIG. 1.

Trace 766 may represent an output of transition detection circuit 190.

In operation, a voltage on trace 766 may control threshold calibration circuit 180 which may modify hysteresis control signal 181 and amplitude control signal 152 as part of a hysteresis calibration mode.

Figure 8:
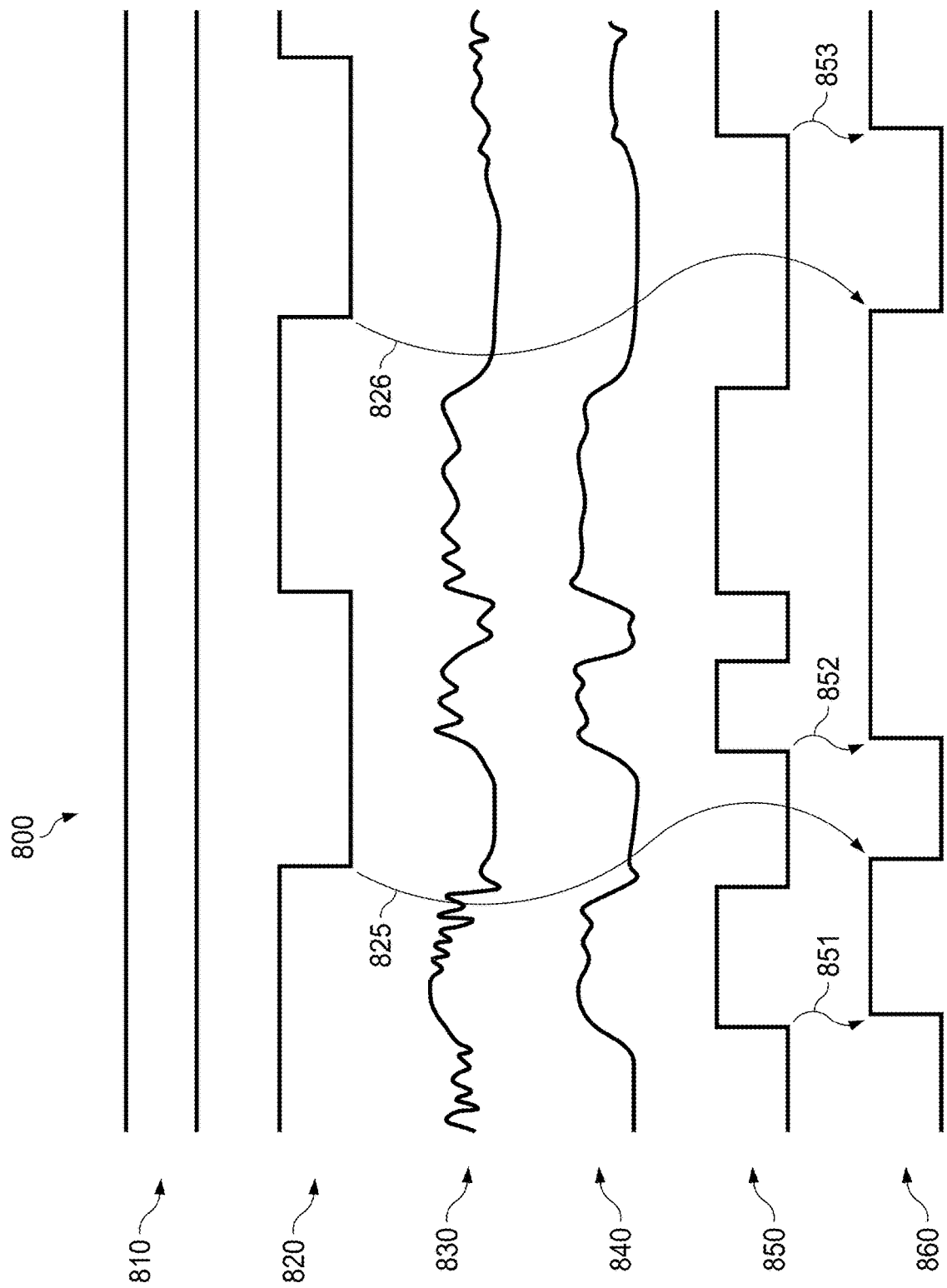
FIG. 8 illustrates one of various examples of signals in a loss of signal detection system.

FIG. 8 illustrates one of various examples of signals in a loss of signal detection system.

Trace 810 may represent a hysteresis control code. The hysteresis control code may remain constant during the time represented in FIG. 8.

Trace 820 may represent a clear/refresh signal for transition detection. The clear/refresh signal may be one of various examples of reset signal 191 as described and illustrated in reference to FIG. 1. Trace 820 represents an active-low clear/refresh signal, but this is not intended to be limiting.

Trace 830 may represent a difference between a positive input and a negative input to a comparator. In one of various examples, trace 830 may represent the difference between positive input 310 and negative input 311 as described and illustrated in reference to FIG. 3. Trace 840 may represent a difference between internal nodes of the comparator. In one of various examples, trace 840 may represent the difference between first stage comparator outputs 321 and 322 as described and illustrated in reference to FIG. 3.

Trace 850 may represent comparator output 161 as described and illustrated in reference to FIG. 1. Trace 850 may be asserted based on trace 830 exceeding a predetermined threshold. Trace 860 may represent a transition detection signal. Trace 860 may represent a transition detection circuit output signal 199 as described and illustrated in reference to FIG. 1. The transition detection signal represented by trace 860 may assert based on a transition in trace 850, as represented at locations 851, 852 and 853. Trace 860 may be reset based on the clear/refresh signal of trace 820 reaching a logic low level, as shown at locations 825 and 826. The assertion of trace 860 at locations 852 and 853 may occur due to transitions of trace 850. Trace 850 may be monitored by transition detection circuit 190 and may result in changes to transition detection signal 199. Transition detection signal 199 may be a transition detection indicator.

Figure 9A:
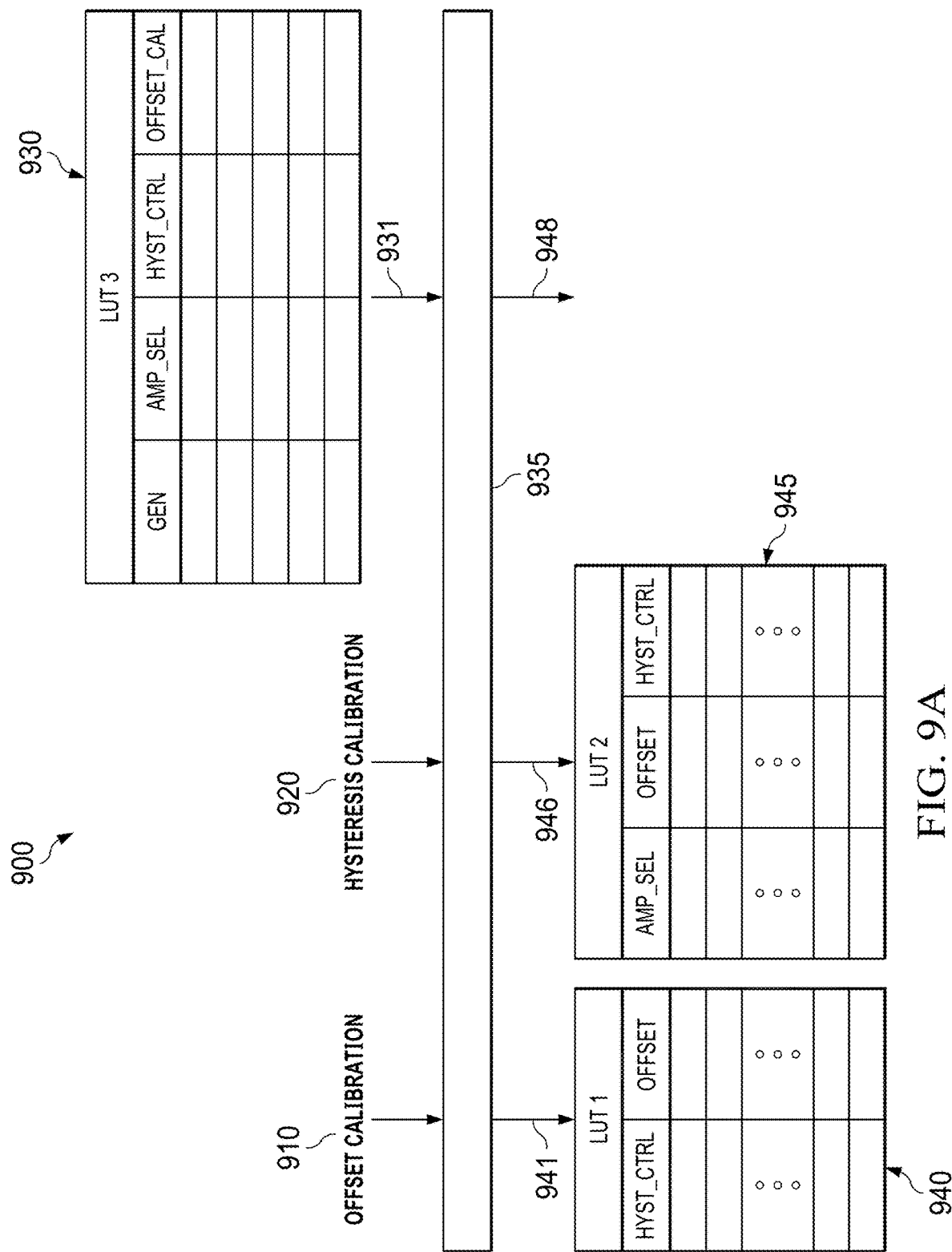
FIG. 9A illustrates one of various examples of offset calibration and hysteresis calibration without temperature compensation.

FIG. 9A illustrates one of various examples of offset and hysteresis calibration without temperature compensation. FIG. 9A illustrates another example of offset and hysteresis calibration as described and illustrated in reference to FIG. 4.

At operation 910, an offset calibration may be performed, during which an offset DAC code and direction may be swept for each hysteresis control code setting. An offset value may be output to loss of signal detection system 935. At operation 920, a hysteresis calibration may be performed, during which for each amplitude control code, the hysteresis control code may be swept from a minimum value to a maximum value. At each setting of the amplitude selection control code, and a hysteresis value may be output to loss of signal detection system 935.

At operation 941, offset values may be written to lookup table 940 for each hysteresis control code. At operation 946, an offset value and a hysteresis control code may be written to lookup table 945 for values of the amplitude control code. Transition detection signal 948 may be output from loss of signal detection system 935.

Lookup table 930 may be used to select values of the amplitude control code, the hysteresis control code and the offset value based on an input, the input to specify one of a data rate and a run length.

Figure 9B:
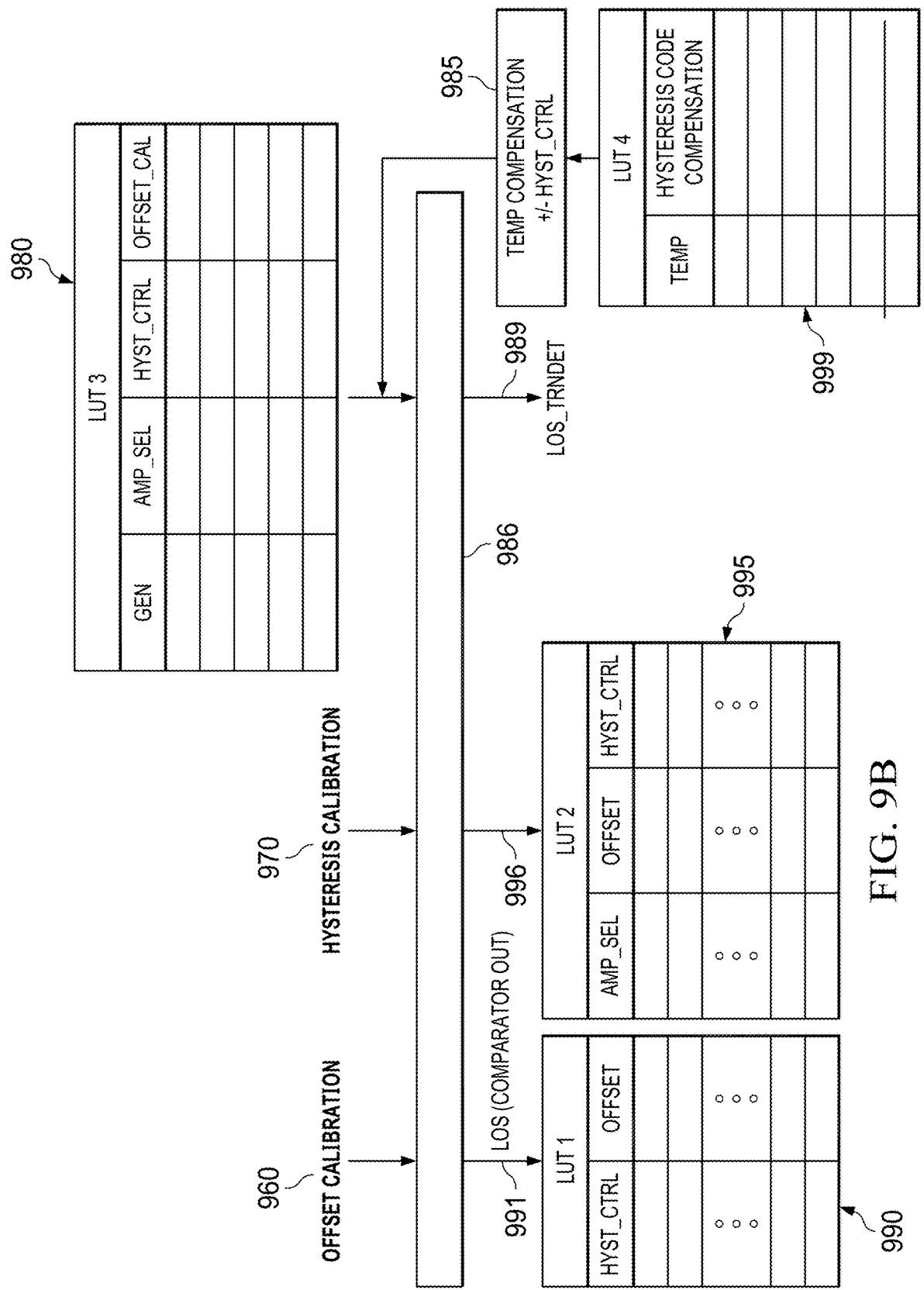
FIG. 9B illustrates one of various examples of offset calibration and hysteresis calibration with temperature compensation.

FIG. 9B illustrates one of various examples of offset and hysteresis calibration with temperature compensation. FIG. 9B illustrates another example of offset and hysteresis calibration as described and illustrated in reference to FIG. 5.

At operation 960, an offset calibration may be performed and an offset value may be output to loss of signal detection system 986. At operation 970, a hysteresis calibration may be performed, and a hysteresis value may be output to loss of signal detection system 986.

At operation 991, offset values may be written to lookup table 940 for each hysteresis control code. At operation 996, an offset value and a hysteresis control code may be written to lookup table 995 for values of the amplitude control code. Transition detection signal 989 may be output from loss of signal detection system 986. Lookup table 999 may be used to modify the hysteresis control code based on measured temperature.

At operation 980, a look up table may be used to select values of amplitude control code, hysteresis control code and offset. At operation 985, a temperature compensation may be performed and may modify the hysteresis control code.

We claim:
1. A system comprising:
one or more signal inputs coupled to a first switch network and coupled to an analog front end (AFE) circuit;
a comparator with one or more comparator inputs, a hysteresis control code input and at least one offset voltage input, the first switch network to selectively couple one of the one or more signal inputs and one or more calibration voltage inputs to the one or more comparator inputs, the comparator coupled to a calibration control circuit;
a transition detection circuit coupled to one or more outputs of the comparator, the transition detection circuit to generate a signal detection indicator;
the calibration control circuit comprising:
a programmable divider to divide a reference clock;
a variable amplitude signal generator to receive the output of the programmable divider and an amplitude control code, the variable amplitude signal generator to generate a signal with an amplitude based on the amplitude control code;
a second switch network to receive input from the output of the variable amplitude signal generator and from a common mode voltage, the second switch network to couple the common mode voltage to the calibration voltage inputs in an offset calibration mode and the second switch network to couple the outputs of the variable amplitude signal generator to the calibration voltage inputs in a hysteresis calibration mode;
a threshold calibration circuit to take input from the signal detection indicator and to generate a hysteresis control signal, the hysteresis control signal coupled to the hysteresis control code input of the comparator and the threshold calibration circuit to generate an amplitude control signal, the amplitude control signal coupled to the variable amplitude signal generator;
an offset calibration logic circuit to take input from the one or more outputs of the comparator and to generate the at least one offset voltage input to the comparator, and
a controller to receive input from the comparator output and the signal detection indicator and to enable the offset calibration mode and the hysteresis calibration mode based on the comparator output and the signal detection indicator.

2. The system as claimed in claim 1, the at least one offset voltage input comprising two voltage inputs in a differential configuration.

3. The system as claimed in claim 1, the programmable divider comprising a divider control signal to specify a divide ratio.

4. The system as claimed in claim 1, the offset calibration logic circuit comprising a logic circuit to take input from the one or more comparator outputs and a digital-to-analog converter (DAC) to convert the output of the logic circuit to one or more analog voltages, the one or more analog voltages coupled to the at least one offset voltage input of the comparator.

5. The system as claimed in claim 1, the controller to enable the offset calibration mode for a first predetermined time and to enable the hysteresis calibration mode for a second predetermined time, the first predetermined time to begin and end prior to the beginning of the second predetermined time.

6. The system as claimed in claim 1, the controller to control the first switch network to couple the one or more calibration voltage inputs to the comparator inputs during the offset calibration mode and during the hysteresis calibration mode.

7. The system as claimed in claim 1, the controller to populate a first look-up table based on a transition in the comparator output.

8. The system as claimed in claim 7, the first look-up table comprising hysteresis control codes and offset control codes.

9. The system as claimed in claim 1, the controller to populate a second look-up table based on a transition in the signal detection indicator.

10. The system as claimed in claim 9, the second look-up table comprising hysteresis control codes, amplitude control codes, and offset control codes.

11. The system as claimed in claim 1, the AFE circuit, comparator, transition detection circuit, calibration control circuit and controller part of a microcontroller.

12. A method comprising:
performing an offset calibration of a comparator, the offset calibration comprising:
coupling one or more inputs of a comparator to a common mode voltage;
setting a hysteresis control code;
coupling the hysteresis control code to a hysteresis setting input of the comparator;
sweeping an offset control code to the comparator in one or more steps from a first value to a second value;
detecting a change in polarity of the comparator output;
recording a value of the offset control code corresponding to the change in polarity of the comparator output for respective values of the hysteresis control code;
repeating the offset calibration for respective values of the hysteresis control code to generate a first look-up table of offset control codes and respective hysteresis control codes;
performing a hysteresis calibration of the comparator, the hysteresis calibration comprising:
setting an amplitude control code and a hysteresis control code;
coupling the amplitude control code to an input of a variable amplitude signal generator and coupling the hysteresis control code to the comparator;
sweeping the hysteresis control code in one or more steps from a maximum value to a minimum value and setting the offset voltage input to the comparator at respective steps based on values recorded in the first look-up table;
detecting a signal detection indicator of a transition detection circuit, and
recording the amplitude control code, the hysteresis control code and the offset control code corresponding to the signal detection indicator in a second look-up table.

13. The method as claimed in claim 12, comprising compensating the hysteresis control code based on a temperature measurement and at least one of the first look-up table and the second look-up table.

14. The method as claimed in claim 12, the first value of the offset voltage input comprising a maximum value and the second value of the offset voltage input comprising a minimum value.

15. The method as claimed in claim 12, the first value of the offset voltage input comprising a minimum value and the second value of the offset voltage input comprising a maximum value.

* * * * *